(12) United States Patent
Luthje et al.

(10) Patent No.: US 8,209,088 B2
(45) Date of Patent: Jun. 26, 2012

(54) STEERING DEVICE FOR VEHICLES

(75) Inventors: Holger Luthje, Braunschweig (DE); Rainer Kist, Freiburg (DE); Thomas Reul, Leinenfelden-Echterdingen (DE)

(73) Assignees: Fraunhofer-Gesellschaft zur Forderung der angewandten Forschung e.V. (DE); Fractal-Technologies (DE)

( * ) Notice: Subject to any disclaimer, the term of this patent is extended or adjusted under 35 U.S.C. 154(b) by 2845 days.

(21) Appl. No.: 09/937,996

(22) Filed: Sep. 28, 2001

(65) Prior Publication Data

US 2010/0179727 A1 Jul. 15, 2010

Related U.S. Application Data

(63) Continuation of application No. PCT/EP00/02389, filed on Mar. 30, 2000.

(30) Foreign Application Priority Data

Apr. 1, 1999 (DE) .................................. 199 15 105

(51) Int. Cl.
*B62D 15/02* (2006.01)

(52) U.S. Cl. ...................................... 701/41; 73/514.39
(58) Field of Classification Search .................... 701/41; 73/514.39, 514.31, 488; 310/68 B, 171; 116/31, 204; 324/173, 174, 207.11, 207.15, 324/207.2, 207.25, 207.13, 207.16, 207.17, 324/179; 180/400; 280/771
See application file for complete search history.

(56) References Cited

U.S. PATENT DOCUMENTS

| 4,800,974 | A | * | 1/1989 | Wand et al. ................... 180/446 |
| 4,848,791 | A | * | 7/1989 | Bridges .................... 280/93.501 |
| 5,314,036 | A | * | 5/1994 | Kato et al. ..................... 180/427 |
| 5,422,810 | A | * | 6/1995 | Brunning et al. ............... 701/41 |
| 5,825,178 | A | * | 10/1998 | Hipp et al. ................. 324/207.2 |
| 6,854,556 | B1 | * | 2/2005 | Yamamoto et al. ........... 180/444 |

* cited by examiner

*Primary Examiner* — Dalena Tran
(74) *Attorney, Agent, or Firm* — Salter & Michaelson (57) ABSTRACT

A steering device which includes coded microstructures which are provided on the steering shaft and/or on a device that is connected to the steering shaft in a non-positive manner; a sensor which detects the microstructures and outputs associated measuring signals; and an electronic circuit to which the measuring signals of the sensor are fed, and which outputs electronic signals to control the steering is disclosed.

42 Claims, 9 Drawing Sheets

STEERING DEVICE FOR VEHICLES

RELATED CASES

This application is a continuation of International Application PCT/EP00/02839 which was internationally filed on Mar. 30, 2000 and has a foreign priority date of Apr. 1, 1999 and which is incorporated herein by reference in its entirety.

BACKGROUND

1. Technical Field

The present application is directed to a steering device for vehicles, and in particular to a steering device comprising a steering shaft, a sensor for determining the movement of the steering shaft, and a circuit for evaluating the measuring signals of the sensor.

2. Background of Related Art

Vehicle steering mechanisms may take different forms. Rack and pinion steerage is used particularly often. With rack steerage, a driver exerts a torque on a steering column via a steering wheel. Direct power transmission then continues via a pinion, i.e. a gear wheel, to a rack. Longitudinal movement of the rack results in longitudinal movement of a steering shaft in, or on which, the rack is mounted. The steering shaft in turn moves the steering gear, with the vehicle wheels arranged on it, and is steered in this manner.

To assist the direct power transmission by the driver it is also known to use hydraulic power-assisted steering mechanisms, in which a pressure chamber runs a piston fixed to the steering shaft. By controlling the pressure in the chamber filled with hydraulic oil the piston can be moved, thereby assisting the steering gear in addition to the power transmission by the driver. Alternatively, the pinion drive may be assisted by an electric motor.

In order to provide these various forms of assistance it is naturally desirable to have a measuring signal available which correlates with the state of the steerage. The signal could then take over appropriate control to boost the steering, for power-assisted steering and similar purposes, and could also allow for self-regulating systems. Over and above the control of the servo mechanism, allowance should also be made for boosting measures to optimise the steering and attenuation action of motor vehicles or simultaneous control of all four wheels and other intelligent steering systems.

Various proposals have already been made for obtaining a signal which correlates with the state of the steerage.

Thus, it is proposed in DE 40 29 764 A1 to arrange length measuring means between the steering wheel and the front axle, responding to displacement of the steering rack. Inductive or ohmic devices are proposed for these means. A design with two magneto-resistive sensors is known from EP 0 410 583 B1. Here, the magnetic coupling is changed on movement of the steering shaft, thus enabling the position to be determined. However, this involves changing the geometry of the steering shaft and also providing it with a groove, which apart from the expense, gives it a certain susceptibility to trouble. EP 0 376 456 B1 also operates with a magnet which is arranged on the steering shaft and surrounded by an induction coil. A change in induction can be associated with a change in displacement.

Steering angle sensors operating with magnetic field sensors, so-called Hall sensors, are known from DE 197 03 903 A1 and DE 197 52 346 A1.

These known proposals have the drawback that measurement only allows restricted accuracy. Another problematic feature is that the measurements are relative, so that measuring errors add up over time. The proposals are not, therefore, practicable for use in intelligent steering systems.

It is known from DE 37 03 591 C2, in a rack steering mechanism at the end of the steering column, to measure the rotary angle of the column by appropriately acting on an induction coil or a piezo power-measuring cell. However, the end of the steering column also carries the power transmission to the steering rack and is both structurally confined and unfavourable for measurements, particularly as a great deal of malfunctioning may take place there.

There is, therefore, needed in the art a steering device in which it is possible to pick up a signal correlating with the state of the steering mechanism and more suitable for controlling intelligent steering systems of that type.

SUMMARY

The present invention is directed to a steering device which includes coded microstructures which are provided on the steering shaft and/or on a device that is connected to the steering shaft in a non-positive manner; a sensor which detects the microstructures and outputs associated measuring signals; and an electronic circuit to which the measuring signals of the sensor are fed, and which outputs electronic signals to control the steering.

The invention proposes a steering device for vehicles which allows absolute measurements of position. Therefore, the disadvantages associated with the state of the art no longer exist. The steering device according to the invention is more accurate and supplies reproducible measuring signals. Regulation and/or control of the movement of the steering shaft becomes possible, particularly for intelligent steering systems.

Advanced surface techniques with processes indicating the microstructure are thus combined with a high-resolution sensor, i.e. a detection system, with an appropriate electronic circuit. The term "microstructures" refers here to structures with dimensions in the micrometer range.

The term "detect" refers particularly to processes where contact-free recognition takes place, preferably optically or magnetically. However, other detection methods which read, sense, feel or otherwise recognise also come into consideration.

The invention allows absolute determination of the position of the steering shaft in a rapid, high-resolution and reliable manner, with resolution in the low micrometer range. Falsification or trouble from electromagnetic fields or in the region of the steering mechanism either does not take place or is negligible.

The invention may be applied successfully in particular to advanced, so-called intelligent steering systems.

It is possible to equip the actual steering shaft with microstructures. The disadvantage of doing so would be the difficulty of manipulating the whole shaft during the fitting process. In order to avoid this, smaller, interchangeable elements which can be non-positively connected to the steering shaft, e.g. in bar form, may be appropriately equipped, then inserted.

The microstructures are advantageously formed so that they contain suitable coding, allowing the position of the steering shaft to be determined accurately.

The microstructures are preferably detected by optical scanning methods, particularly using elements from microsystem technology. Microsystem technology is understood here as the fields of microstructure technology, micro-optics and fibre optics. Microlenses with diameters down to about 10 μm and focal lengths of the same order of magnitude may be used. If glass or other fibres and very small diameters are used, the microlenses can be fixed directly on the end face of the fibres. The entire system may have Y branches and is integrated with individual modules to form a compact microsystem. The modules may, if appropriate, be spatially offset over the optical fibres—for example to allow optoelectronic components and the evaluating electronic means to be operated optimally within low-temperature ranges.

Tribologically suitable film systems are advantageously applied to the steering shaft or to a linear means connected thereto without play, described as a device or measuring device. This may be done by thin film processes which have proved successful in other industrial fields. Special microstructures are produced by high-resolution structuring and etching processes. The microstructures are constituted so that they can be read by the sensors.

The optical contrast, i.e. the difference in reflectivity, of the microstructures to the steering shaft surface below them may for example be modified, so that the pattern can be optically recognised by means of miniaturised fibre optical systems. Another example is to make the microstructures in the form of a reflection hologram, with coding as in the previous example (segment-wise) and with reading effected by a suitable miniaturised optical system. The functional layer may be crystalline or amorphous and the hologram may be written in a phase or angle code. The hologram may function in one frequency range (monochromatic) or more than one (coloured), and the information may be written (to the hologram) by a digital or analog process.

Other physical methods may be employed instead of, or as well as, optical sensors or optically detectable microstructures. Thus, microstructures may also be formed in magnetic films, e.g. CoSm or NdFeB. The sensors could then in particular be magnetic sensors, otherwise used in data storage technology.

Microstructures are produced on the steering shaft or on the device non-positively connected thereto in the form of incremental markings. Tribologically optimised layer systems are preferred, using high-resolution lithographic or laser technology methods suitable for three-dimensional applications. The lithographic methods considered are of the photo, electronic, X ray and/or ionic type.

Multiple-layer or composite structures may equally be employed.

The patterns formed are preferably dimensioned in micrometers. The layer systems, combined with an appropriate sensory recognition system, enable the current position to be determined absolutely, to an accuracy of only a few micrometers.

In an advantageous embodiment of the invention two complementary, parallel patterns are provided with suitable coding, e.g. bit coding. In one embodiment the marking structure comprises strips which are optically distinguishable by reflection, the strip patterns containing binary L/O coding.

In this way the displacement-measuring system, which may be fully integrated into the steering mechanism, can recognise the current absolute position of the steerage in every operating phase by means of the bit coding.

Various patterns are possible. For example a dual code, a Gray code or even stepped codes known per se from relevant mathematical processes may be used.

It is particularly preferable to use optical sensors, especially fibre-optical double sensors, for scanning the markings and microstructures. Multiple sensors are also possible, especially in array form.

In a preferred method the microstructures are produced by applying thin film techniques. These techniques are advantageously PVD (physical vapour deposition) and/or CVD (chemical vapour deposition). As already mentioned, structuring is effected by lithographical processes.

The microstructures can also be formed by dry etching and/or wet chemical etching.

Alternatively, they may be made by laser beam techniques, e.g. direct-writing laser ablation processes and/or laser-lithographic processes and/or direct-action mask-related laser structuring methods.

The microstructures are preferably built up from tribological hard-material layered systems. Single or multi-layer films may be used. They are preferably made of titanium nitride (TiN) and/or titanium aluminium nitride (TiAlN) and/or titanium carbonitride (TiCN) films and/or aluminium oxide films and/or amorphous diamantine hydrocarbon films with or without metal doping and/or amorphous diamantine carbon films with or without metal doping and/or amorphous CN films and/or cubic boron nitride films and/or diamond films.

BRIEF DESCRIPTION OF THE DRAWINGS

It should be understood that the drawings are provided for the purpose of illustration only and are not intended to define the limits of the invention. The foregoing and other objects and advantages of the embodiments described herein will become apparent with reference to the following detailed description when taken in conjunction with the accompanying drawings in which.

DETAILED DESCRIPTION OF THE PREFERRED EMBODIMENTS

Figure 1:
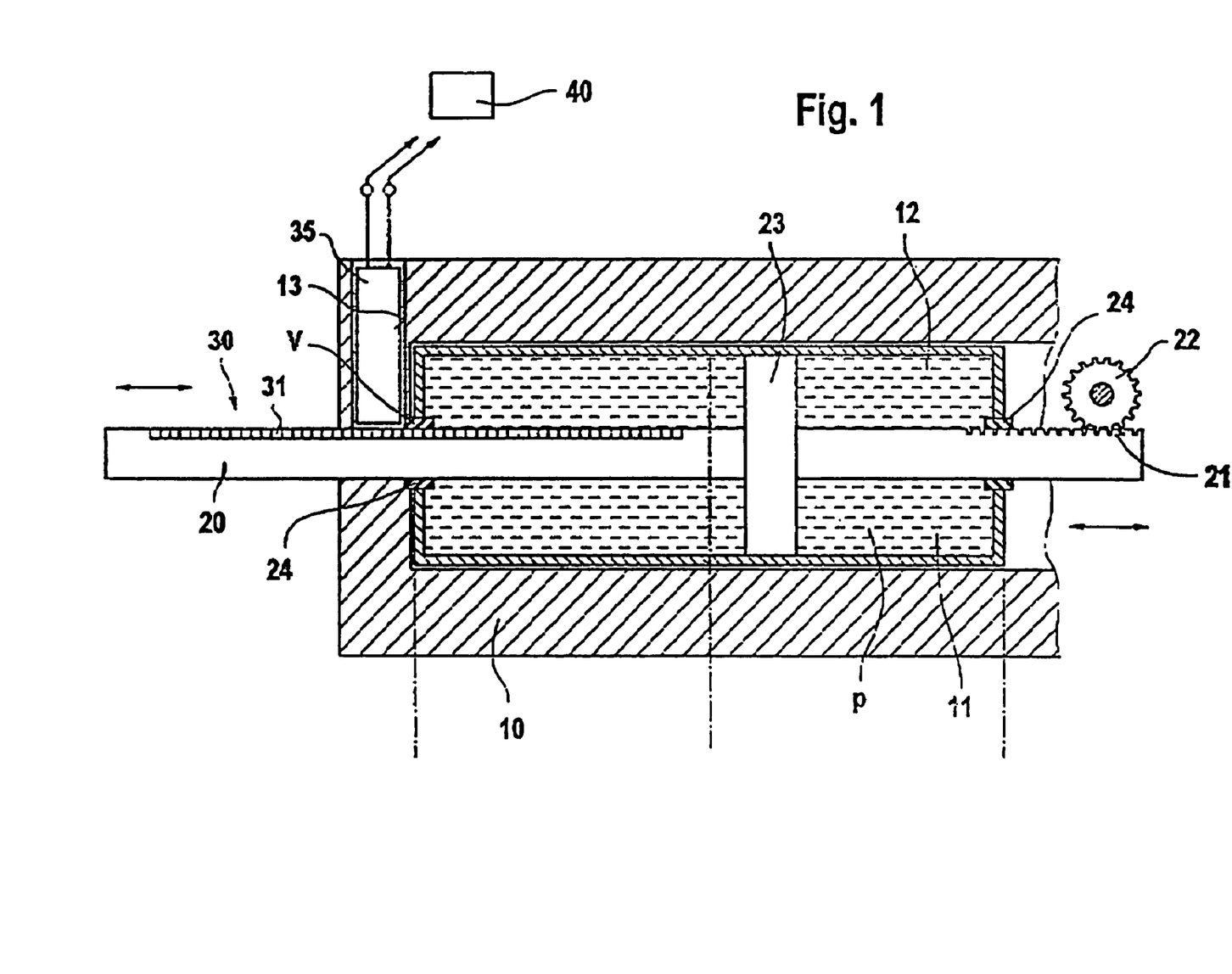
FIG. 1 is a diagrammatic section through elements of an embodiment of a steering device according to the invention.

A first embodiment of a steering device according to the invention is shown in FIG. 1, and includes a mounting block 10, inside which there is a pressure chamber 11 containing hydraulic oil 12, the chamber 11 being nearly full of oil 12 as shown. The oil 12 is under a pressure p. In FIG. 1 the mounting block 10 is represented purely diagrammatically; it is substantially cylindrical here, with considerable proportions of the block extending out of FIG. 1.

The steering shaft 20 runs approximately along the cylinder axis of the mounting block 10. It thus extends through the pressure chamber 11 with the hydraulic oil 12. The shaft 20 is provided with a steering rack 21, indicated here in FIG. 1 by corresponding tooth signs. The rack 21 is driven by a pinion 22. The pinion is coupled to the steering mechanism of a vehicle (not shown). When the steering wheel e.g. of a passenger car is turned the corresponding torque is transmitted through the pinion 22 to the rack 21 and displaces the whole steering shaft 20 with it along the axis through the mounting block 10.

A piston 23 is also seated on the steering shaft 20 with a non-positive connection thereto. It is arranged inside the pressure chamber 11 and thus in the hydraulic oil 12, whereas the pinion 22 and rack 21 are located outside the chamber 11.

The steering shaft 20 thus passes through the wall of the pressure chamber 11 in two places. Both places are sealed by seals 24, preferably Viton seals. The piston 23 moves along with the shaft 20 by virtue of its non-positive connection thereto. It fills the entire cross-section of the chamber 11. The piston 23, and thus the steering shaft 20, can consequently be moved by changes in the pressure of the hydraulic oil 12. This is a common method of strengthening the forces exerted by the user of the vehicle through the pinion 22.

Suitable diameters for steering shafts 20 are about 20 to 40 mm, suitable diameters for pressure chambers 11 about 40 to 70 mm, steering shafts 20 may e.g. have lengths of the order of 800 mm, and the length of the pressure chamber 11 may e.g. be 200 to 400 mm. Quite different dimensions may of course be appropriate according to the requirements for the steering device, as would be known to those of skill in the art.

A mounting bore 13 is formed in the mounting block 10 outside the pressure chamber 11. It extends from the outer wall of the block 10 to the through bore in which the steering shaft 20 is located. The mounting bore 13 contains a sensor 35 which may for example comprise the ends of a fibreglass sensory mechanism.

In this particular region the outside of the shaft 20 is provided with marking 30. The marking 30 comprises microstructures 31 arranged on top of the shaft 20. These are coded axially of the shaft 20 so that different bit patterns pass below the sensor 35 when the shaft 20 moves longitudinally relative to the mounting block 10. The signals from the sensor 35 are passed to an electronic circuit 40 (not specifically shown in FIG. 1). The circuit 40 can then determine and transmit the position of the shaft 20 relative to the block 10 from the readings of the sensor 35.

Apart from the longitudinal movement of the shaft 20 other movements of the shaft are not important for the steering mechanism. Hence nothing concerning any rotation of the shaft 20 is shown in FIG. 1. Any versions which ensure that the pinion 22 runs appropriately over the steering rack 21 are possible here.

Figure 2:
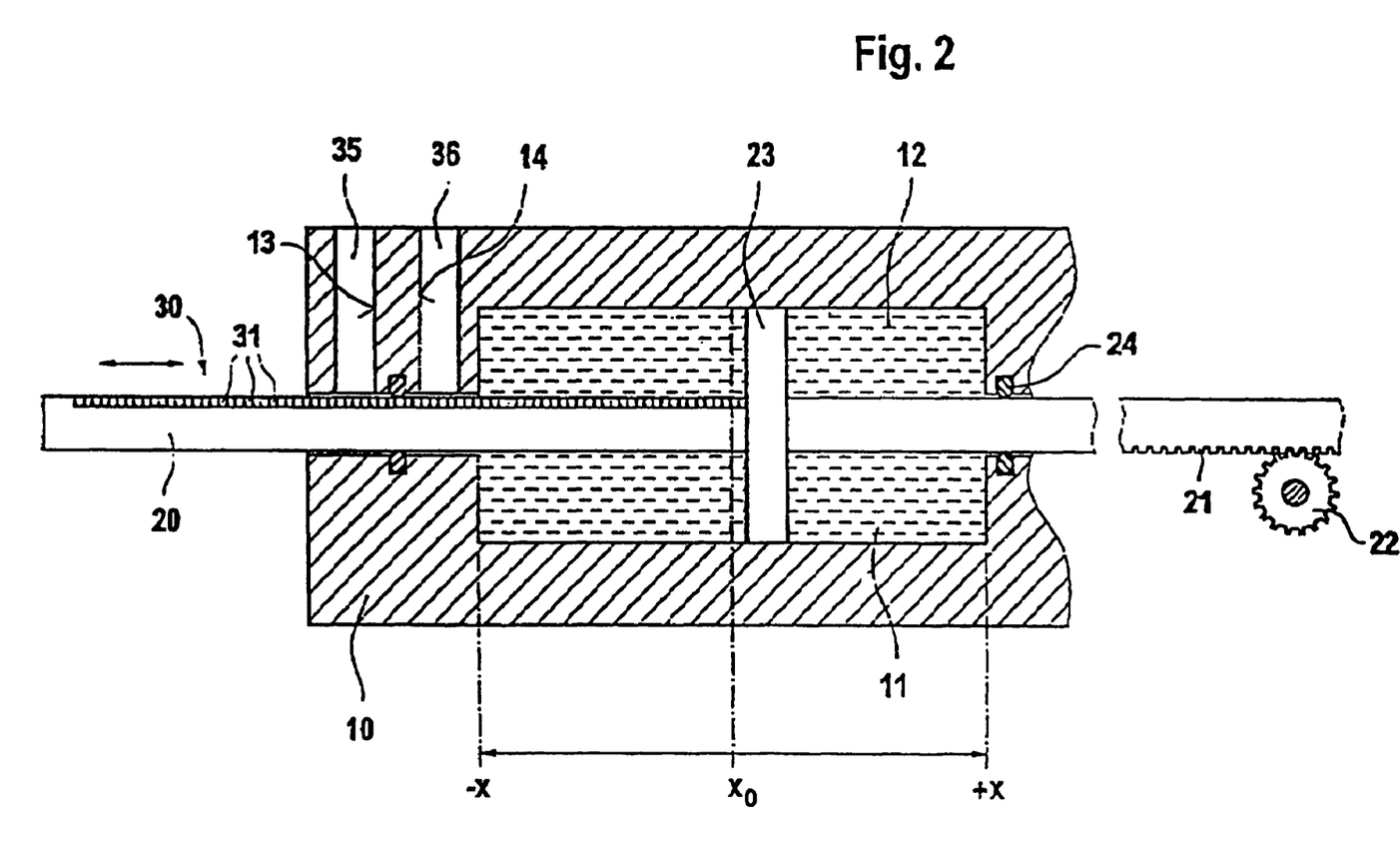
FIG. 2 is an alternative embodiment to FIG. 1.

Another, alternative embodiment is shown in FIG. 2 in a view similar to FIG. 1.

In FIG. 2 the mounting block 10 will again be recognized, along with the pressure chamber 11 and hydraulic oil 12. The steering shaft 20 with the rack 21 again passes through the block 10 and chamber 11. Here too, the pinion 22 drives the rack 21. A piston 23 which can move inside the pressure chamber 11 is also seated on the shaft 20.

In contrast with FIG. 1, a mounting bore 13 is not only provided, but another mounting bore 14 is also provided outside the pressure chamber 11.

This difference enables two sensors 35 and 36 to be provided. Redundant or complementary microstructures 31 of the marking 30 or microstructures double-coded in another form can, therefore, be read out. The sensors 35 and 36 are preferably fibre optic reflection ones. The light source for the reflection sensors is formed by light-emitting diodes (LEDs), which are spectrally adapted to the hydraulic oil 12 used in the pressure chamber 11. Pentosin may preferably be employed as the hydraulic oil 12.

The pressure p of the hydraulic oil 12 in the pressure chamber 11 is regulated by valves in a valve control housing (not shown).

The steering shaft 20 is sealed at the openings where it passes into and out of the pressure chamber 11 by seals 24, for example Viton seals. It thus has a central position corresponding to the steering angle 0°. This is indicated as central position $X_0$ in FIG. 2. Movement respectively to the right and left then takes place in the direction of steering shaft position +X (right) and in direction −X (left). These respective end positions correspond to a linear stroke which may typically be ±75 mm. It results in different stop angles of the steering mechanism according to the type of vehicle. The linear stroke may also be smaller, e.g. ±50 mm in individual cases, according to the type of vehicle.

In FIG. 2, the two mounting bores 13 and 14 are arranged outside the pressure chamber 11, so the two individual sensors 35 and 36 are also arranged outside it. It is also possible to provide an integrated pair of sensors.

In another embodiment, the sensor or sensors 35 and 36 may be positioned inside the pressure chamber 11. The sensor or sensors may then, for example, be spaced from the steering shaft 20 and pick up the steering shaft data as an optical sensor through the hydraulic oil 12.

This enables the sensor to provide information about the turbidity of the hydraulic oil 12 in the chamber 11, as well as reading the microstructures 31 of the marking 30 on the steering shaft 20. The information can be used as a criterion for changing the oil 12. A suitable transmitting wavelength for the optical sensor 35 is selected according to the turbidity and spectral absorption of the oil 12. A system of this type operates even when dirty with abraded particles or an oil film, and preferably has suitable redundancy, fault tolerance and azimuthal tolerance for safety reasons.

The sensors may be fibre optic sensors with two individual fibres. As indicated in FIG. 2, the fibres may be parallel or inclined to each other to absorb incoming and reflected light (not shown). However, it is also possible to use fibre optic reflection sensors in a Y structure or to take into account arrangements with fibre lines or fibre bunches.

The sensors 35 and 36 or a sensor system 37 (see FIG. 3 for such a system) are employed as transmitters or receivers and may be coupled direct to the fibres by a particularly temperature-resistant installation and connection method. Alternatively, they may be arranged over a feed fibre located in a lower-temperature region. In another embodiment, the sensor module is fabricated as a compact, miniaturised (microtechnical) module and mounted in the system in order to simplify assembly.

In another embodiment (not illustrated) designed to increase reliability and avoid malfunctioning, two sensors 35 are juxtaposed azimuthally. These then sense two complementary bit patterns, both in the form of individual markings 30 applied by the thin film method and arranged parallel, with corresponding microstructures 31.

Figure 3:
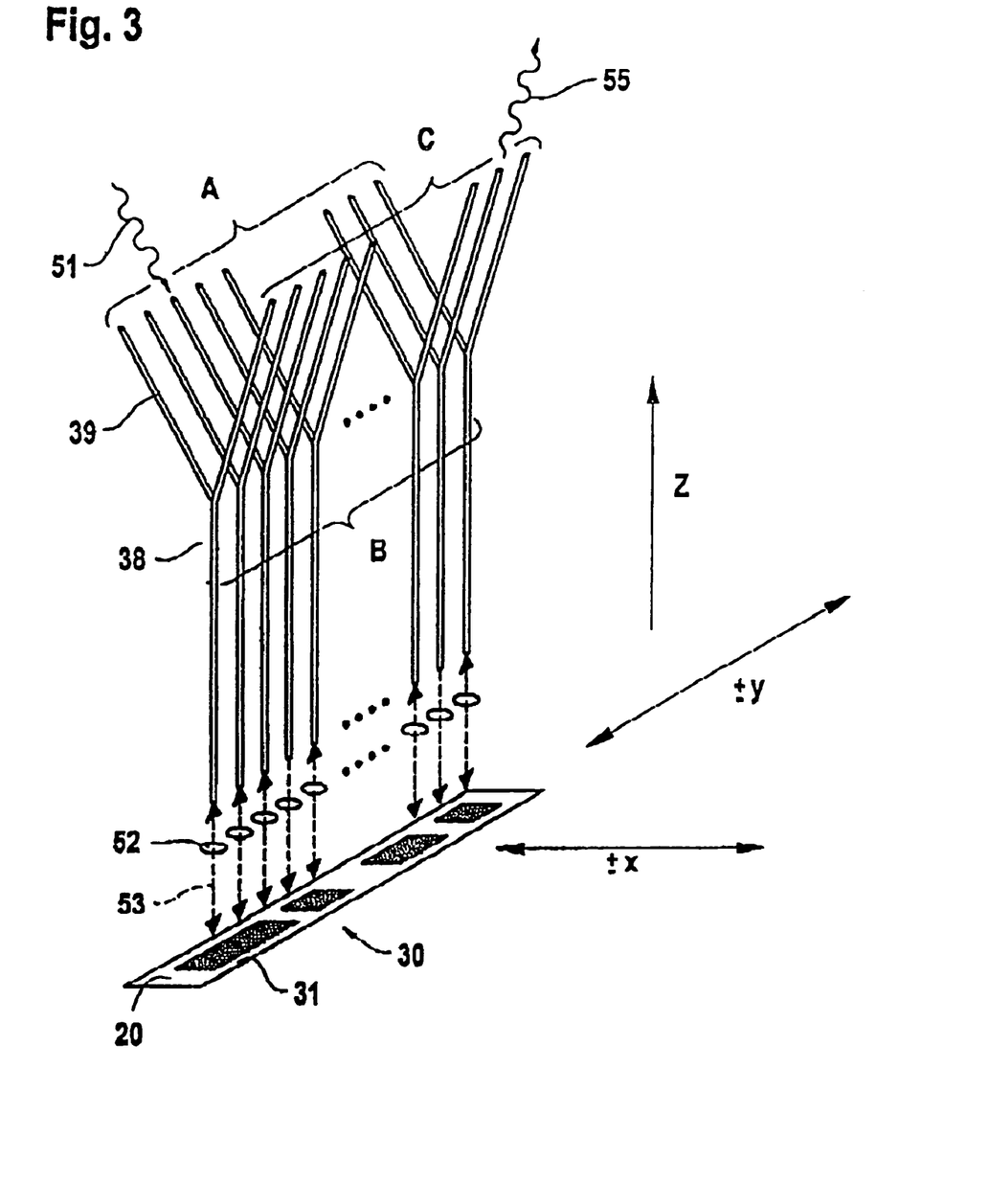
FIG. 3 is a diagrammatic representation of a microsystem-type sensor system for an embodiment of the steering device according to the invention.

An embodiment of marking 30 with microstructures 31 is shown diagrammatically in FIG. 3. Here, the steering shaft 20 is reproduced purely diagrammatically as a cut-out; it extends parallel with the x-direction indicated.

A sensor system 37 with an array of fibre optical Y branches 38 can further be seen. It has a module "A" for generating and coupling the light 51 into the input or coupling-in fibres 39 of the fibre optical Y branching element 38.

A module "B" is also provided, with an array arranged in the y-direction of lenses 52, particularly microlenses, for generating parallel output beam pencils. The output beam pencils 53 fall onto the microstructures 31 of the marking 30 on the steering shaft 20. These microstructures 31 form a succession of sequences. Position-specific selective retroflection takes place. The retroflected light passes back through the lenses 52 into the fibres of module B and thence to a module C for uncoupling and detecting the light 55 retroflected and leaving the fibre optical Y branching element 38.

Moreover in FIG. 3:

±x is the axial direction, i.e. the direction of movement of the steering shaft;

±y is the azimuthal direction, i.e. the direction in which the position-specific bit pattern is arranged; and z is the direction in which the sensor system is installed.

Coordinates x and z are orthogonal to each other; coordinate z points in the direction of the tangent to the surface of the steering shaft 20 which is orthogonal to x and z.

Figure 4:
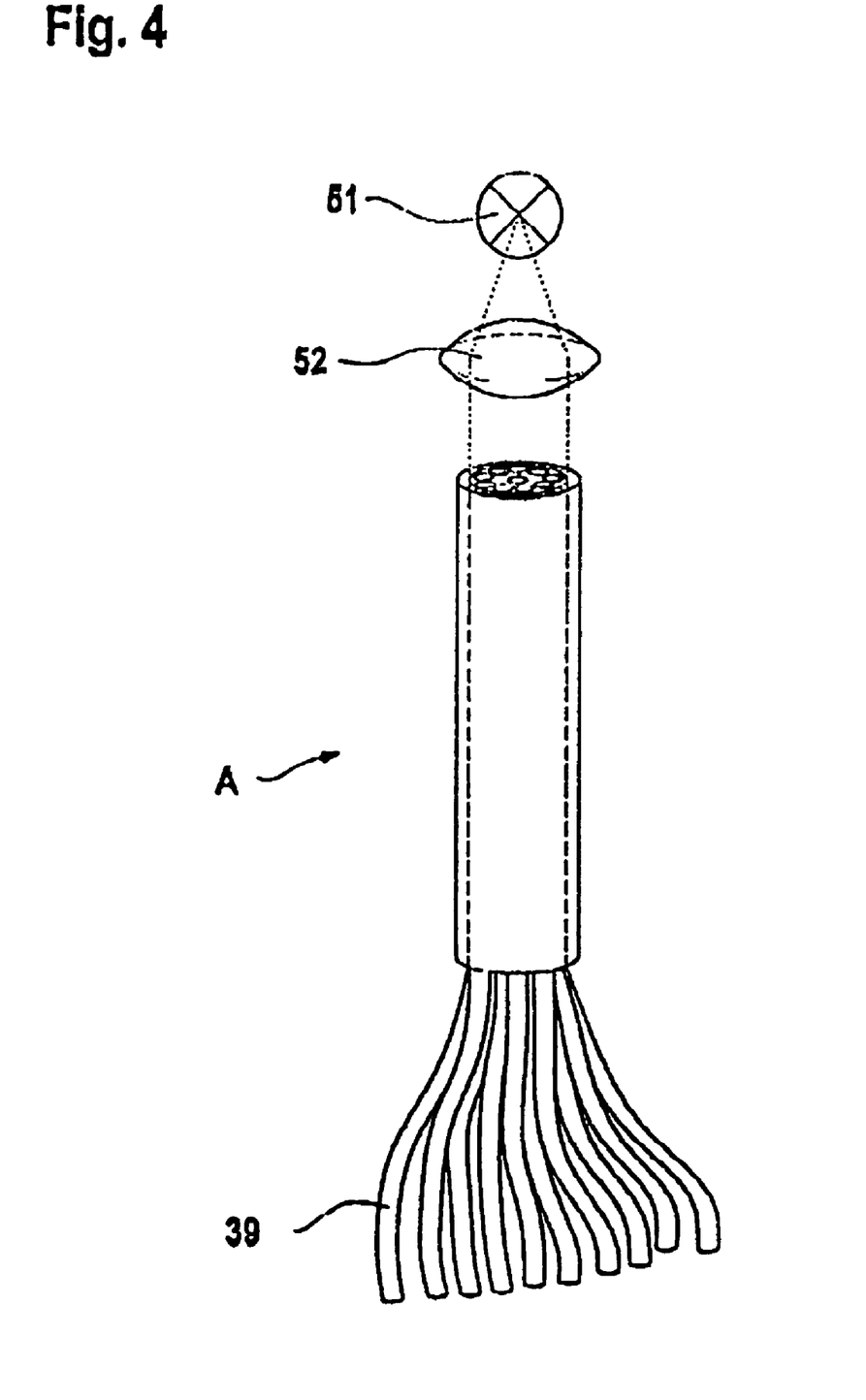
FIG. 4 is a detailed representation of a member from FIG. 3.

FIG. 4 shows a detail from FIG. 3, namely a first version of a transmitting and coupling-in module "A" with a single source 51, a single lens 52 and a plurality of coupling fibres 39 of the Y branching element 38.

Figure 5:
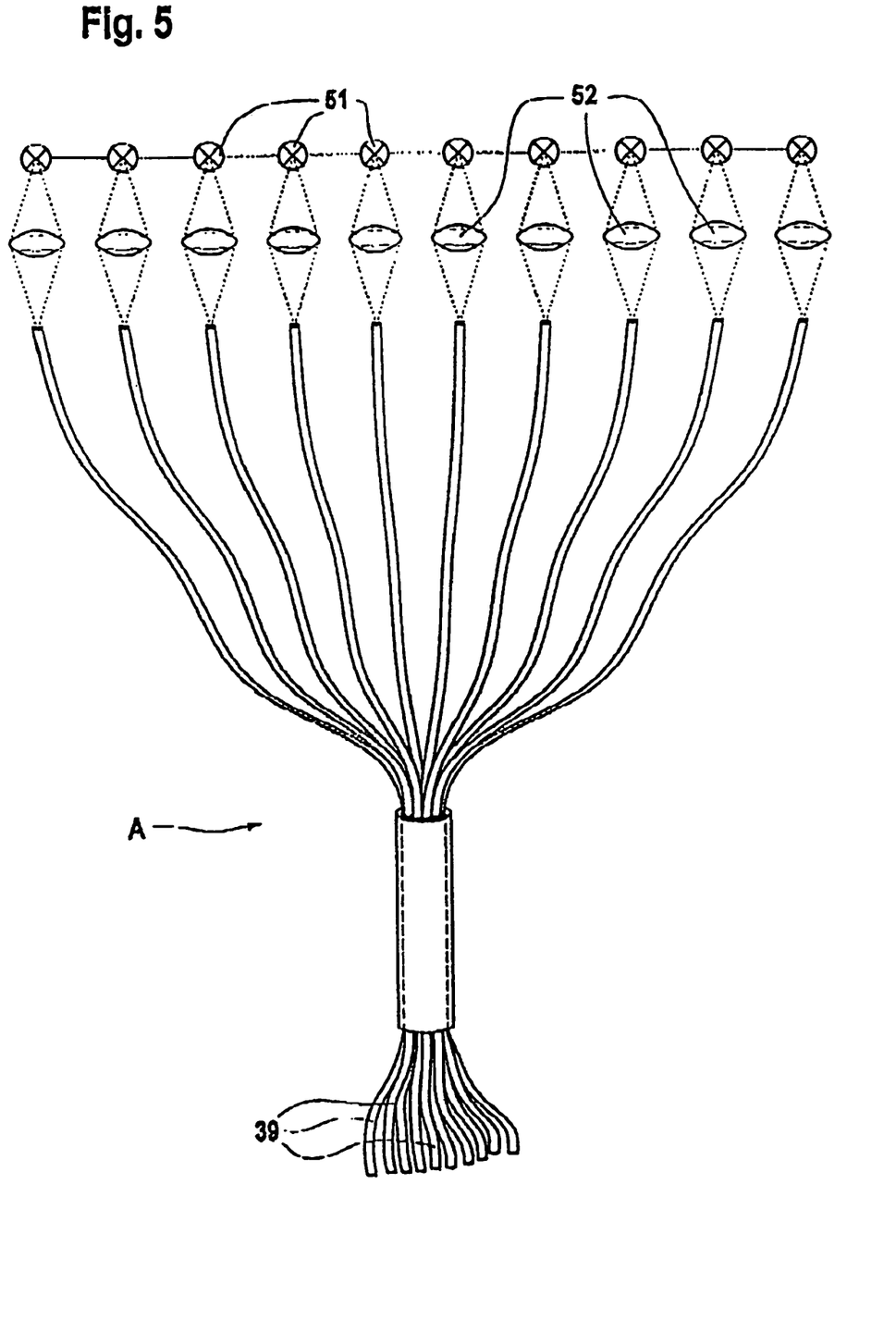
FIG. 5 is a detailed representation of an alternative embodiment of that member from FIG. 3.

FIG. 5 shows an alternative to FIG. 4, a different version of a transmitting and coupling-in module "A" with an array of lenses 52. The fibres are bunched then separated again as coupling fibres 39 of the Y branching element 38.

Figure 6:
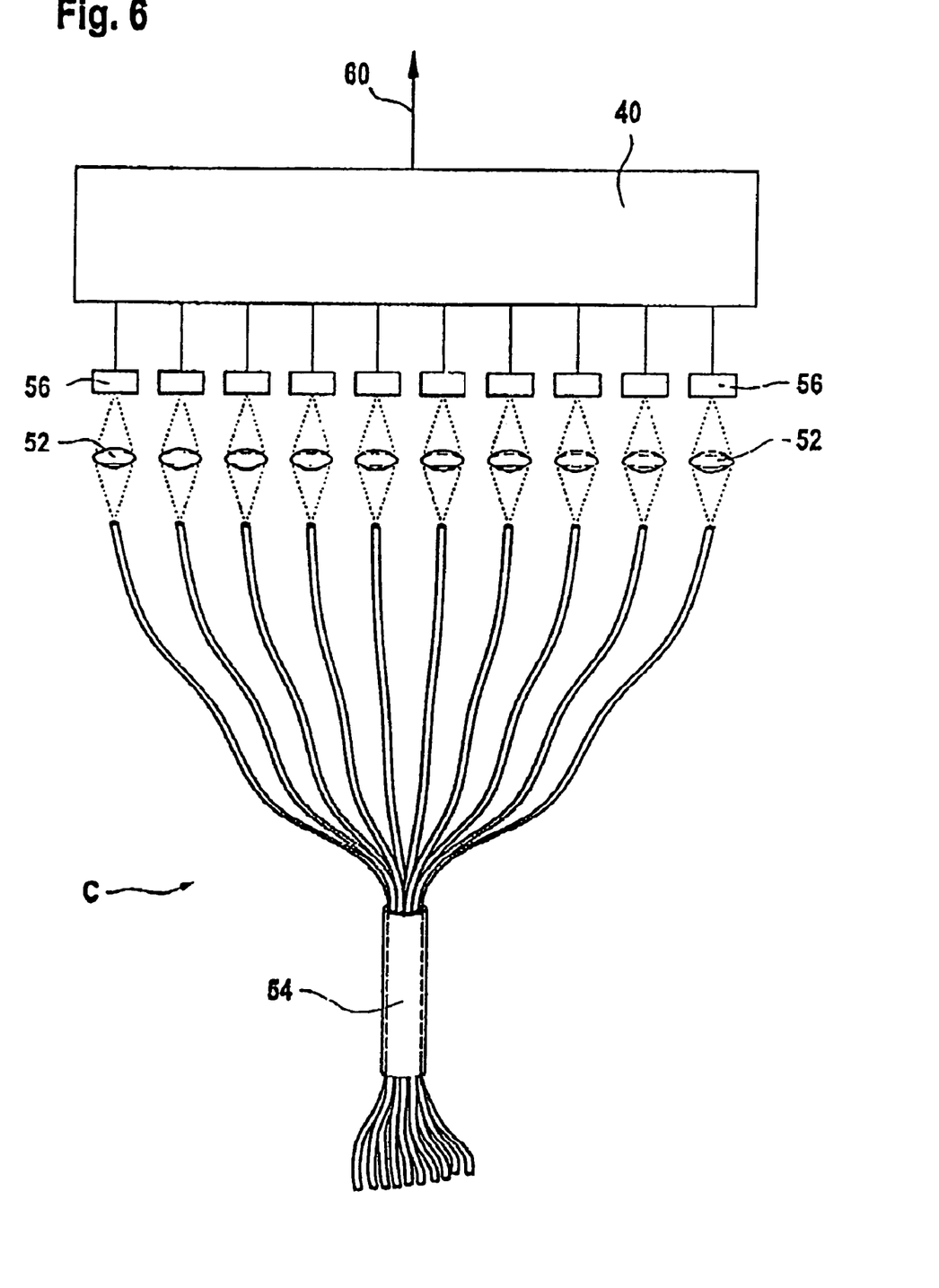
FIG. 6 is a detailed representation of another member from FIG. 3.

FIG. 6 shows another detail from FIG. 3, namely an embodiment of an uncoupling, reception and assessment module "C" with uncoupling fibres 54 bunched along a certain length, an array of lenses 52, a line of detectors 56, the electronic circuit 40 with the electronic assessment means and the output signal 60 with the "position of the steering shaft".

Figure 7:
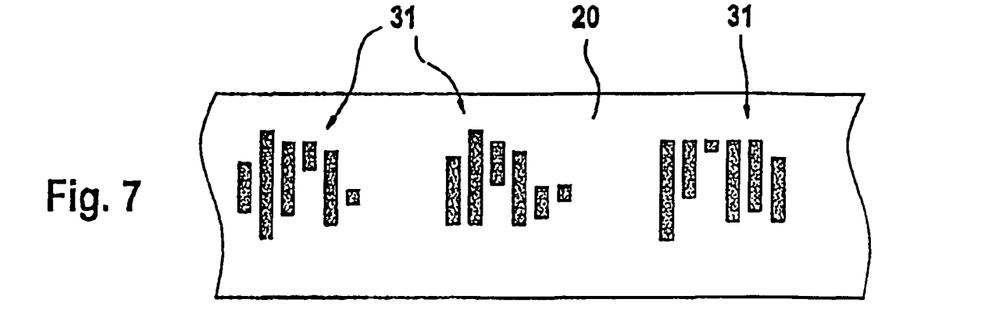
FIG. 7 shows an example of a microstructure.

FIG. 7 shows 8-bit coding in a radial direction and periodic displacement marks in an axial direction.

Figure 8:
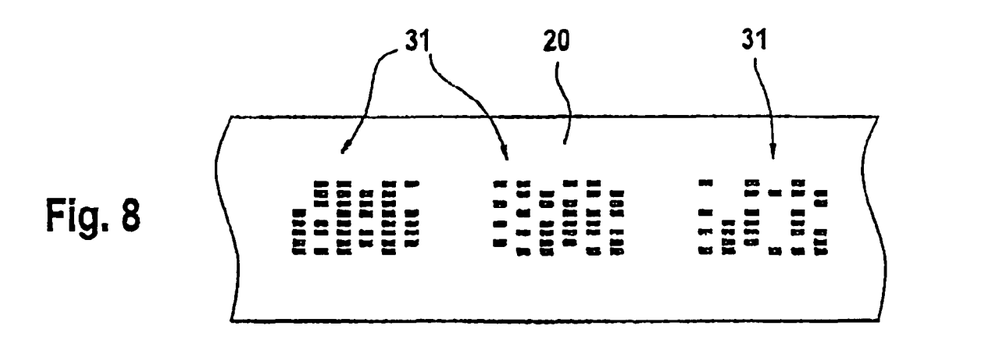
FIG. 8 shows an alternative embodiment of FIG. 7.

FIG. 8 shows an example of an arrangement of blocks with individual coding.

Figure 9:
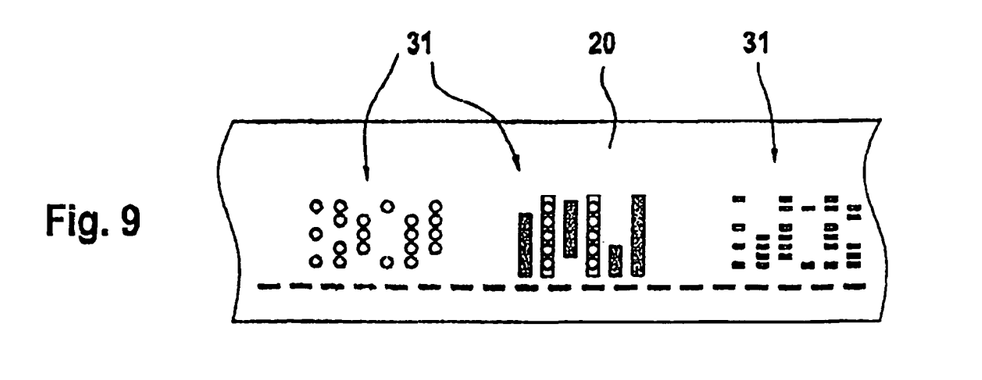
FIG. 9 shows another alternative embodiment of FIG. 7.
Figure 10:
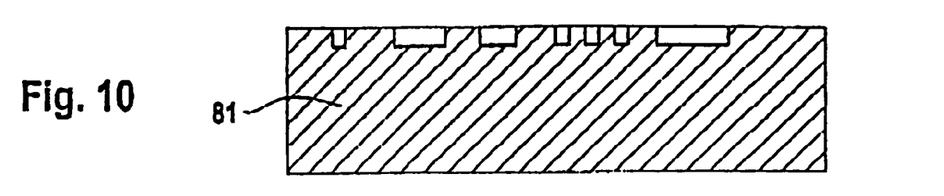
FIG. 10 is a diagrammatic section through a microstructure.

FIG. 9 shows an example of an arrangement of different structure sequences and a guide structure with periodic division for tracking with azimuthal displacement.

FIGS. 10-14 show embodiments of possible methods of producing the microstructures 31. A coded pattern is produced on a basic member 81, which may also be the steering shaft 20 or another device non-positively coupled thereto. For a version where detection is to take place by optical blanking of the patterns the basic member 81 is surface-treated with a focused laser beam, so that laser-ablative processes at the point of action cause stripping and thus lasting marking (cf. FIG. 10).

Figure 11:
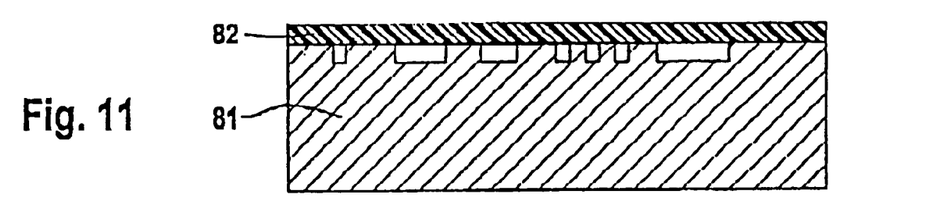
FIG. 11 shows the FIG. 10 embodiment after a possible further processing step.

Eximer lasers are preferably used for this purpose, owing to their high resolution. The pattern thus produced can then be covered with a friction and wear-reducing film 82, as shown in FIG. 11. A metal-doped amorphous hydrocarbon film is well suited as such a covering film in the region of the steering shaft, and is preferably applied in a thickness of 0.5 to 5 µm by known plasma-supported PACVD processes (magnetron sputtering processes with a substrate bias and a hydrocarbon gas, preferably $C_2H_2$). Titanium or tungsten is preferably employed as the doping metal for this application. The metal-doped amorphous hydrocarbon layer may, for example, be produced using a Leybold large capacity sputtering plant, model Tritec 1000 with two tungsten targets installed. The plant has a rotary holder which can accommodate up to 20 steering shafts according to the equipment. After the normal pumping process whereby the chamber is pumped out to about $10^{-5}$ hPa, argon is admitted up to a pressure of $3 \times 10^{-3}$ hPa and the substrate is surface-cleaned by ion bombardment at a bias potential of 100 to 300 V. The targets are pre-sputtered at about 6 KW in the process. A graded film of tungsten-doped hydrocarbon is formed without interrupting the plasma, by opening the target covers and successively adding $C_2H_2$ to the process. A few minutes later the $C_2H_2$ gas flow is adjusted to bring the ratio of tungsten to carbon in the layer to 5-10%. During the production of the metal-doped amorphous hydrocarbon film the substrates are coupled with a bias potential of from about 100 to 300 V, preferably 200 V. Under these conditions a film thickness of about 1 µm is applied in half an hour.

Figure 12:
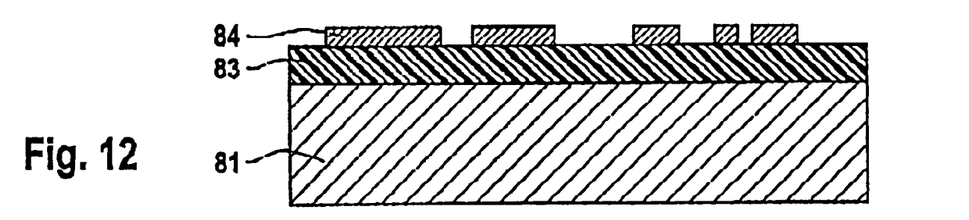
FIG. 12 is a diagrammatic section through another embodiment similar to FIG. 10.
Figure 13:
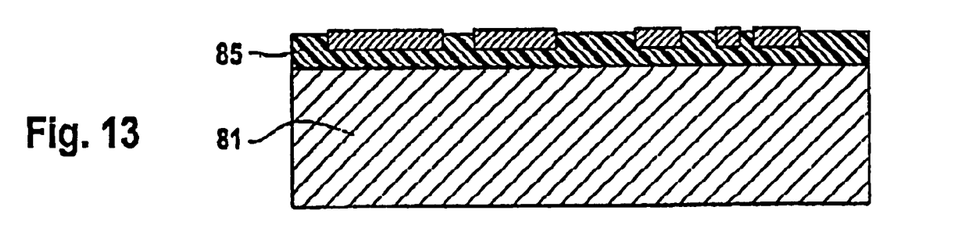
FIG. 13 is a diagrammatic section through a third embodiment similar to FIG. 10.
Figure 14:
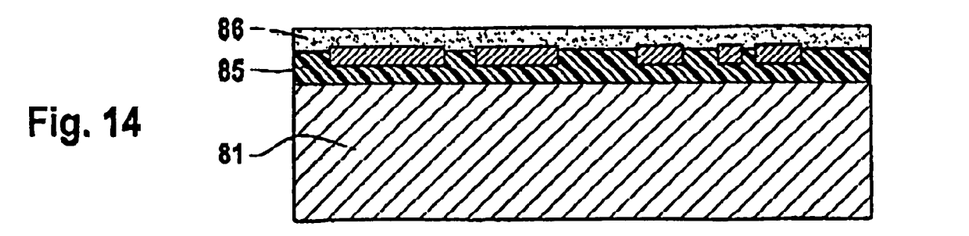
FIG. 14 shows the FIG. 13 embodiment after a possible further processing step.

Other solutions explaining the use of a structured film are shown in FIGS. 12-14. The film structure may be utilized for different sensing principles. In the case of optical detection, film structures may e.g. have an appropriate contrast (surface or edge contrast) with the surrounding surface. The film structure may, however, be produced from a magnetic material and read by means of a magnetic sensor or a magnetic sensor matrix. In such a case a magnetic film is used, preferably a film of CoSm or FeSi or NdFeB, with or without additives.

The steering shaft 20 or basic element 81 is coated in a vacuum process, in this case with two films 83, 84, the lower film 83 respectively being a metal-doped amorphous hydrocarbon film onto which a TiN film is deposited. The thickness of the upper film 84 is approximately 0.5 µm. TiN is preferably used in combination with a Ti-doped hydrocarbon film. The ethine is merely substituted by nitrogen, again without interrupting the plasma. The film 84 is structured by photolithography, by coating the coated steering shaft 20 with a photosensitive resist. It is approximately 2.5 µm thick. The patterns are then produced over a large area on the shaft by means of a mask.

When the resist pattern has developed, the TiN film 84 is removed from places where there are no photosensitive resist patterns, by wet-chemical etching using known etching agents.

Patterns may also be made countersunk, i.e. planarized, as shown in FIG. 13. In such a case, the steering shaft 20 is coated with, for example, a W-doped amorphous hydrocarbon film 85, after which a photoresist pattern is formed on it. By means of photoresist masking a 0.2-1.0 µm depression is then etched in the W-doped amorphous hydrocarbon film in a reactively conducted plasma etching process (etching gases $Ar/SF_6$). The photoresist mask is maintained and the depression is then refilled by sputtering e.g. TiN. This makes the surface even microscopically smooth.

A further embodiment is illustrated in FIG. 14, where a tribologically optimised film 86 for the previously described substructure is applied. In this case, even film materials which do not necessarily have good tribological properties may be used to form the pattern.

Figure 15:
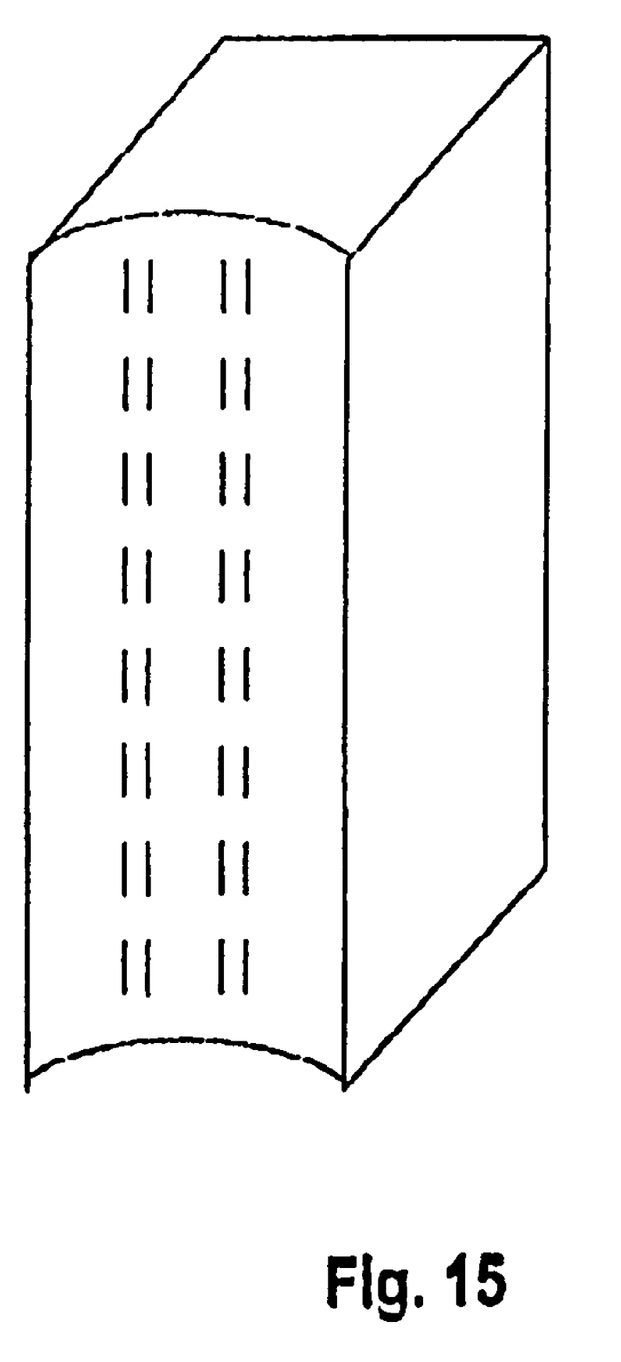
FIG. 15 is a diagrammatic representation of an embodiment of a sensor.

An embodiment of a sensor 35 is shown in FIG. 15. This is a magnetic sensor. It comprises a linear arrangement of magnetic sensors which can read a magnetic structure e.g. in an 8-bit code. The polar structures of the reading head are shown; operating safety is improved and the number of codings increased by using a second line. The sensor 35 may, for example, be made from known magnetoresistive or inductive single sensors produced by similarly known thin film methods. To minimize the spacing from the magnetic microstructures on the steering shaft 20, the polar structures of the reading sensors are arranged on an arc matching the diameter of the shaft.

It will be understood that various modifications may be made to the embodiments disclosed herein. Therefore, the above description should not be construed as limiting, but merely as exemplifications of a preferred embodiment(s). Those skilled in the art will envision other modifications within the scope and spirit of the invention.

What is claimed is:

1. A steering device for vehicles including a steering shaft, the steering device comprising:
   a sensor for determining the movement of said steering shaft, and a circuit for evaluating the measuring signals of the sensor;
   coded microstructures disposed on the steering shaft and/or on a device that is connected to the steering shaft in a non-positive manner;
   said coded microstructures having a thickness of 100 nm to 100 μm;
   said sensor positioned for detecting the coded microstructures and outputting an associated measurement signal;
   said circuit receiving the measurement signal and outputting an electronic signal representing a steering condition.

2. The steering device of claim 1, wherein the microstructures form a succession of sequences arranged in an axial direction on the steering shaft and/or the device non-positively connected thereto.

3. The steering device of claim 2, wherein each sequence comprises multiple and/or single structures arranged spatially in an azimuthal and/or axial direction and containing individual or block-type coding.

4. The steering device of claim 2, wherein the sequences contain bit coding.

5. The steering device of claim 2, wherein a plurality of sequences are combined in a block, the blocks being distinguishable from each other by coding.

6. The steering device of claim 2, wherein the sequences arranged in an axial direction are present in redundant form, offset parallel more than once over the periphery of the steering shaft and/or device.

7. The steering device of claim 1, wherein the microstructures are in complementary form.

8. The steering device of claim 1, wherein the smallest details of the microstructures have lateral dimensions of 5 nm to 5 mm.

9. The steering device of claim 8, wherein the smallest details of the microstructures have lateral dimensions of 1 μm to 1 mm.

10. The steering device of claim 1, wherein the microstructures have a level surface and are levelled by a planarizing method.

11. The steering device of claim 1, wherein the microstructures are built up from or covered with tribological hard-material layered systems.

12. The steering device of claim 11, wherein the hard-material layered systems are single films or multi-layer films of TiN and/or TiAlN and/or TiCN films and/or aluminium oxide films and/or amorphous diamantine hydrocarbon films with and without metal doping and/or amorphous CN films and/or cubic boron nitride films and/or diamond films.

13. The steering device of claim 1, wherein the sensors are arranged in the form of a line and/or array.

14. The steering device of claim 1, wherein the sensors are optical sensors.

15. The steering device of claim 14, wherein the sensors are optical fibreglass sensors.

16. The steering device of claim 15, wherein the sensors are fibre-optical double or multiple sensors.

17. The steering device of claim 14, wherein the microstructures are in the form of a reflection hologram.

18. The steering device of claim 1, wherein the sensors are magnetic sensors.

19. The steering device of claim 18, wherein the magnetic sensors are in a linear arrangement for reading a multi-bit code, particularly an 8-bit code.

20. The steering device of claim 18, wherein the sensor has a reading head with polar structures arranged on an arc matching the diameter of the steering shaft.

21. A method of making a steering device including a steering shaft, the method comprising the steps of: applying coded microstructures on the steering shaft or on a device non-positively connected to the steering shaft using thin film methods, said step of applying coded microstructures including applying by one of lithographic application and laser application methods; detecting the microstructures and outputting an associated measuring signal by means of one or more sensors; and evaluating the measuring signal by means of an evaluation circuit to determine appropriate action for steering control.

22. The method of claim 21, wherein the thin-film method is a PVD and/or CVD method.

23. The method of claim 21, wherein the microstructures are formed by a dry etching process and/or a wet-chemical etching process.

24. The method of claim 21, wherein the microstructures are produced by a laser beam process.

25. The method of claim 24, wherein the laser beam process used is a direct-writing laser ablation process and/or a laser-lithographic process and/or a direct-action mask-related laser-structuring process.

26. The method of claim 21, wherein the thin film application is by means of a tribologically optimized layer system.

27. The method of claim 21, wherein the microstructures are formed by a photo-lithographic method.

28. The method of claim 21, wherein the microstructures are produced by photo, electronic, X ray and/or ionic type.

29. A steering device for vehicles including a steering shaft, the steering device comprising:
   a housing defining a fluid filled pressure chamber;
   said steering shaft comprising a steering rack driven from a pinion;
   said steering shaft extending through the pressure chamber and having respective ends thereof at opposed sides outside of the pressure chamber;
   said pinion disposed outside of said pressure chamber adjacent one end thereof for driving said rack;
   coded microstructures disposed on the steering shaft and/or on a device that is connected to the steering shaft;
   a sensor for determining the movement of said steering shaft;
   said sensor positioned for detecting the coded microstructures and outputting an associated measurement signal;
   and a circuit for evaluating the measuring signal from the sensor;
   said circuit receiving the measurement signal and outputting an electronic signal representing a steering condition.

30. The steering device of claim 29, wherein said coded microstructures having a thickness of 100 nm to 100 μm.

31. The steering device of claim 29 wherein the microstructures form a succession of sequences arranged in an axial direction on the steering shaft and/or the device non-positively connected thereto.

32. The steering device of claim 29, wherein the sensors are one of optical sensors and magnetic sensors.

33. The steering device of claim 29, wherein the microstructures are built up from or covered with a tribological hard-material layered system.

34. The steering device of claim 29, wherein the coded microstructures are disposed at the other end of the steering shaft, and further including at least one mounting bore in the housing for receiving the sensor.

35. The steering device of claim 34, including a pair of sensors and an associated pair of mounting bores for receiving respective sensors.

36. The steering device of claim 29, wherein pressure chamber has respective one and other ends, the pinion comprising a pinion gear disposed for engagement with the rack outside of the pressure chamber and adjacent the one end thereof, the sensor disposed in alignment with the coded microstructures and disposed adjacent the other end of the pressure chamber.

37. The steering device of claim 36, wherein the other end of the steering shaft extends beyond the pressure chamber, the coded microstructures extend along a length thereof that extends beyond the pressure chamber, and including seals and respective opposed locations where the rack extends beyond the housing.

38. A steering device for vehicles including a steering shaft, the steering device comprising:
- a sensor for determining the movement of said steering shaft, and a circuit for evaluating the measuring signals of the sensor;
- coded microstructures disposed on the steering shaft and/or on a device that is connected to the steering shaft in a non-positive manner;
- said coded microstructures having a thickness of 100 nm to 100 μm;
- said sensor positioned for detecting the coded microstructures and outputting an associated measurement signal;
- said circuit receiving the measurement signal and outputting an electronic signal representing a steering condition;
- said steering device constructed by a method that includes applying the coded microstructures on the steering shaft or on a device non-positively connected to the shaft using thin film methods, and that the applying is effected by a photo-lithographic method.

39. The device of claim 38, wherein the thin-film method is a PVD and/or CVD method.

40. The device of claim 38, wherein the microstructures are formed by a dry etching process and/or a wet-chemical etching process.

41. The device of claim 38, wherein the microstructures are produced by a laser beam process.

42. The device of claim 41, wherein the laser beam process used is a direct-writing laser ablation process and/or a laser-lithographic process and/or a direct-action mask-related laser-structuring process.

* * * * *